June 21, 1955 L. C. MURDOCK 2,711,531

AUTOMATIC GAIN CONTROL CIRCUIT

Filed Jan. 15, 1951 3 Sheets-Sheet 1

Inventor:
Lawrence C. Murdock,
by Merton D. Moore
His Attorney.

June 21, 1955 L. C. MURDOCK 2,711,531

AUTOMATIC GAIN CONTROL CIRCUIT

Filed Jan. 15, 1951 3 Sheets-Sheet 2

Inventor:
Lawrence C. Murdock,
by Morton D. Moore
His Attorney.

Inventor:
Lawrence C. Murdock,
by Merton D. Morse
His Attorney.

2,711,531

AUTOMATIC GAIN CONTROL CIRCUIT

Lawrence C. Murdock, Syracuse, N. Y., assignor to General Electric Company, a corporation of New York Application January 15, 1951, Serial No. 206,076
9 Claims. (Cl. 343—17.1)

Figure 1:
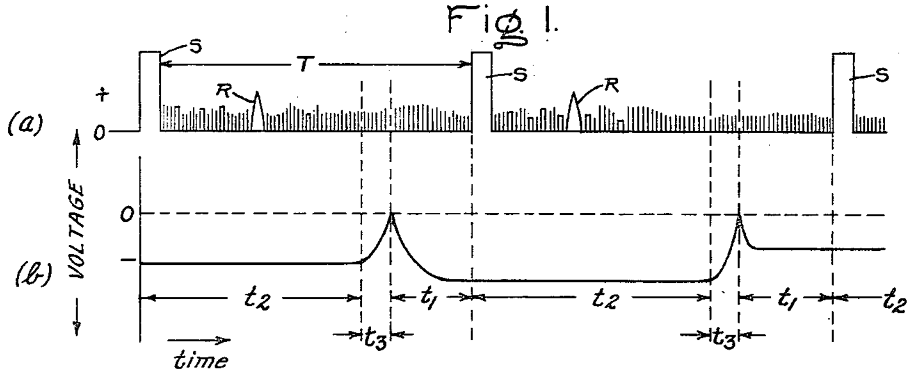

My invention relates to automatic gain control circuits, and particularly to such circuits as applied to gated, radio-pulse receivers.

A radio receiver operating in the presence of jamming signals exhibits a reduction in useful signal-to-noise ratio. In addition, if the receiver is equipped with a conventional automatic gain control, the presence of jamming signals reduces the gain of the intermediate frequency stages of the receiver causing a reduction of the absolute value of both noise and signal. The net result is a loss in signal-to-noise ratio during reception which appears to be much greater than is actually the case.

In the particular case of a radar type obstacle detector, large variations in gain of the radar receiver due to the presence of jamming results in either a blooming of the obstacle indications on the screen of the intensity modulated cathode ray tube associated with the radar equipment or a loss in receiver gain such that obstacles detected by the radar are not properly displayed. If the noise output of the receiver can be kept constant, then the operating level of the intensity modulated cathode ray tube will be stabilized with the result that obstacle indications may be better resolved.

Accordingly, an object of my invention is to provide an arrangement for maintaining the noise level in a receiver substantially constant despite the presence of jamming signals.

Another object of my invention is to provide added control of the output noise level of a receiver without interfering with the proper operation of any automatic gain control circuit operating on the preceding intermediate frequency stages.

Another object of my invention is to provide novel means for minimizing the effects of jamming signals on radar operation.

Another object of my invention is to provide an arrangement for repeatedly sampling the output of a radar receiver during one portion of time between pulse transmission to derive a control signal, and for utilizing said control signal during a different portion of the time between said pulse transmissions.

Another object of my invention is to provide an arrangement for repeatedly sampling the noise output of a radar receiver during a portion of the time between pulse transmissions when substantially no pulse echoes will be observed and for repeatedly varying the gain of a receiver in accordance with the intensity of said sampled noise.

Another object of my invention is to provide a novel means for producing a substantially constant video noise output from a radar receiver despite occasional jamming input to the receiver.

Another object of my invention is to provide a method and means for displaying the position of obstacles within the normal display range of a radar obstacle detection equipment, and for modifying said display to indicate the detection of obstacles located outside said normal display range.

Another object of my invention is to provide a novel means for recurrently and rapidly establishing the gain of a pulse receiver in accordance with the intensity of noise samplings made in the time between the reception of desired pulses.

Figure 2:
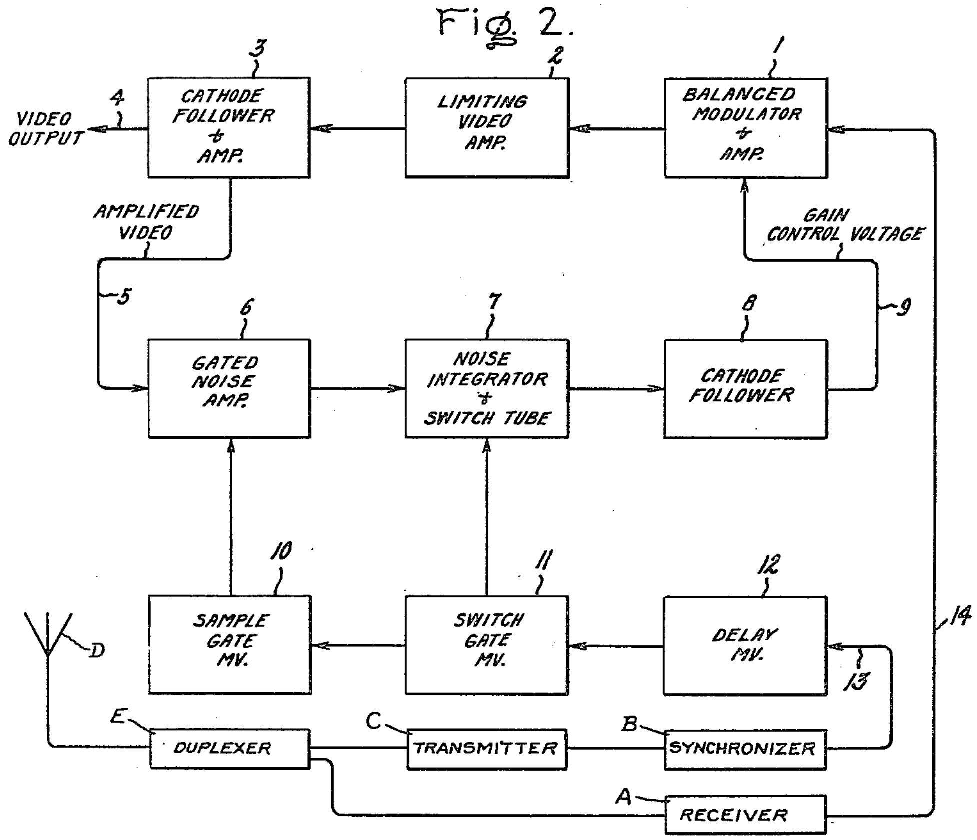
Figure 3:
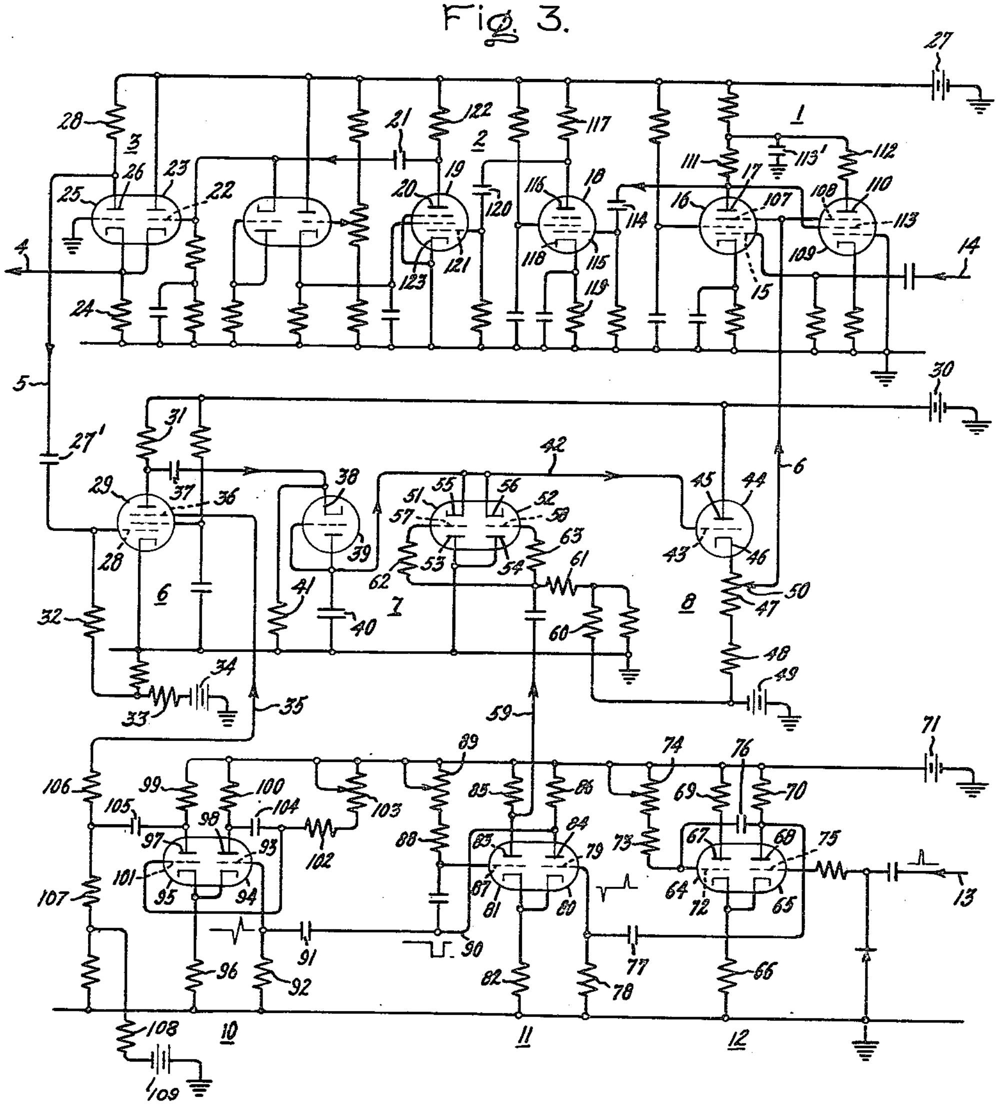
Figure 4:
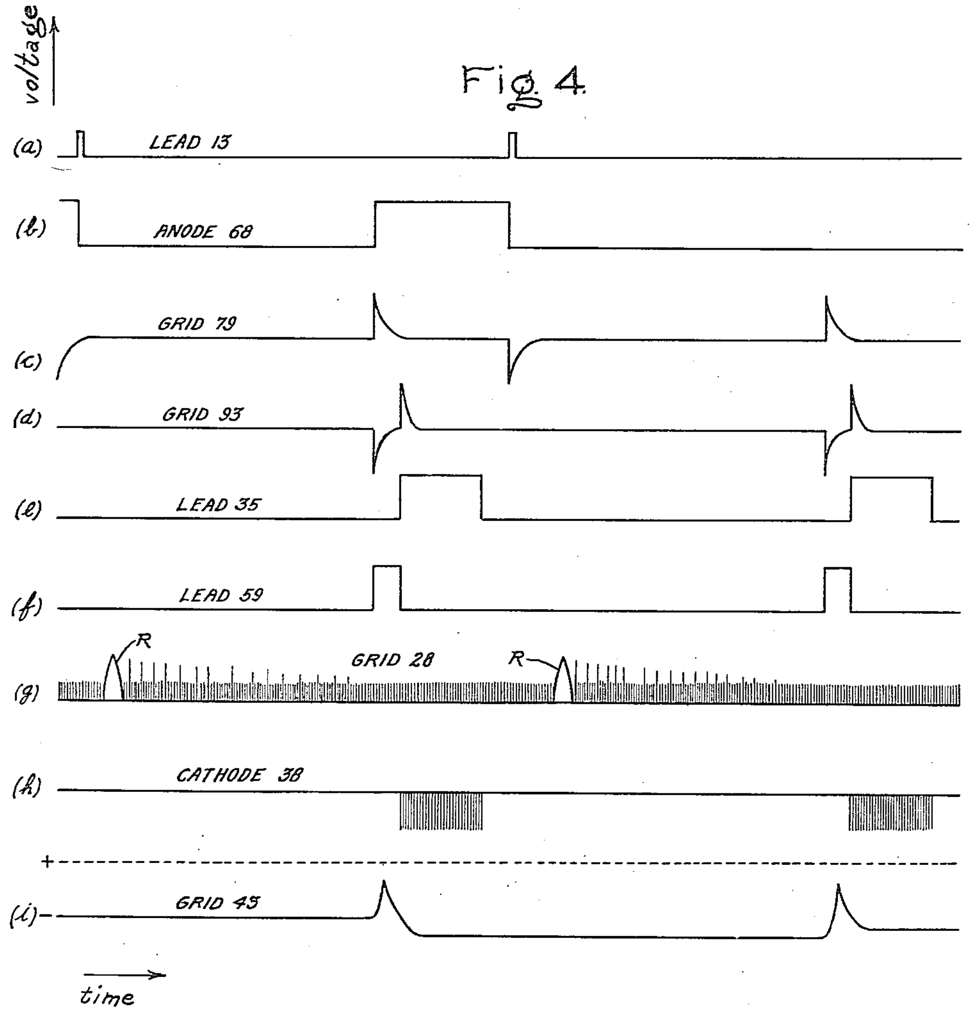

The novel features which I believe to be characteristic of my invention are set forth with particularity in the appended claims. My invention itself, however, together with further objects and advantages thereof can best be understood by reference to the following description taken in connection with the accompanying drawings in which Fig. 1 illustrates graphically the nature of the signals involved in radar reception and the gain control signals developed in accordance with my invention; Fig. 2 illustrates in block diagram form an embodiment for carrying out the invention; Fig. 3 is a schematic circuit diagram of an automatic gain control circuit for a radar receiver embodying the present invention in a preferred form and Fig. 4 illustrates graphically the nature of the wave shapes encountered in the circuit diagram of Fig. 3.

In accordance with one embodiment of my invention applicable to radar obstacle detection systems, means are provided for sampling the noise output of the radar receiver during a portion of each range sweep period when echo pulses are not observed. The sampled noise voltages are converted into a unidirectional voltage proportional to the amplitude of the noise and employed as a video gain control voltage for the subsequent reception of an echo pulse. This general type of arrangement is disclosed in the copending application of Jenus L. Dunn, filed on September 15, 1949, bearing the Serial Number 115,889 and assigned to the present assignee. According to the instant invention the gain control voltage for the video stages is obtained from a storage circuit which is discharged and then immediately charged to a level depending upon the intensity of the noise samplings.

Referring to graph *a* of Fig. 1, the signals involved in radar reception, shown in somewhat idealized form, are plotted against time. The synchronizing pulses S, occurring periodically at the time intervals T, are employed to synchronously control the directional transmission of radar pulses. An obstacle located in the field of said transmissions reradiates an echo pulse which is received and shown as R on the time scale of graph *a*. The time interval between the pulse S and the subsequent pulse R corresponds to the range of the obstacle from the radar transmitting and receiving equipment. The lower amplitude, single-line markings represent the undesired signals or noise which may originate in the receiver or be generated externally, such as by a jamming source. The noise signals which are shown to be substantially continuous, are superimposed on the pulse echo returns available at the output of a radar receiver.

In order to provide an automatic gain control circuit which is adjusted for each pulse transmission, the receiver noise output, which also includes any jamming signals, is sampled during a period between pulse transmissions when echo pulses are not observed. In the present instance, this corresponds to a range in excess of the maximum range of the equipment. In Fig. 1, this is shown to be during the time intervals $t_1$. The noise sampling is employed to charge a storage circuit to a unidirectional voltage level corresponding to the amplitude of the sampled noise. This stored unidirectional voltage is then employed to control the radar video amplifier stages during the periods, shown as $t_2$ in the drawing, when radar echo pulses are being received. Prior to each sampling period $t_1$, and during a period shown as $t_3$ in the drawing, the storage circuit is discharged and immediately charged to a newly sampled level during the subsequent period $t_1$.

Referring to graph *b* of Fig. 1, the amplitude of the gain control voltage available from the storage circuit is plotted with respect to time. It is seen that a new control potential is established for each time interval $t_2$ after each pulse transmission. A control voltage derived in this manner results in a fast operating automatic gain control operable over a wide range of noise levels. This in turn permits improved receiver operation especially when operating in the presence of jamming. The result is a more consistent display of pulse echoes on the radar indicator, permitting better resolution of radar returns.

Referring again to graph *b* of Fig. 1, it is seen that means must be provided for timing the charge and discharge periods of the storage circuit during the periods $t_1$ and $t_3$ with respect to the time occurrence of the synchronizing pulses S initiating the radar pulse transmissions.

There is shown in Fig. 2 in block diagram form an arrangement for providing this operation. Video signals including noise and pulse echoes, as shown in graph *a* of Fig. 1, are applied from the second detector of a conventional radar receiver A to the balanced modulator and amplifier 1. The output of modulator and amplifier 1 is applied through a limiting video amplifier 2 and the cathode follower portion of the block 3 to the video output lead 4. This output may then be employed for intensity modulating the electron beam of a cathode ray tube employed in displaying the radar echoes. A portion of the video output available from the amplifier portion of block 3, is applied over lead 5 to a series of stages 6, 7 and 8, to be described, for deriving the automatic gain control voltage. This gain control voltage, available on lead 9, is then applied to the balanced modulator and amplifier 1 for controlling the gain thereof.

Since the gain control is to be in accordance with the level of the noise output of the receiver, means must be provided for sampling only the noise portion of the video output available over lead 5. In accordance with the embodiment of the invention disclosed in Fig. 2, only the noise portion of the signal available over lead 5 is gated through the gated noise amplifier 6 to charge the gated noise integrator 7 to the level of the gated noise amplitude. This voltage charge is then passed through cathode follower 8 to lead 9 for application to the balanced modulator and amplifier 1 for gain control purposes. Prior to operation of the sample gate multivibrator 10, which controls the interval during which a portion of the video noise output is applied to the noise integrator 7, switch gate multivibrator 11 is arranged to operate to cause the switch tube portion of block 7 to conduct to discharge the noise integrator to a given reference level. Thus when sample gate multivibrator 10 does operate, the noise integrator 7 is able to charge up to the new level of the gated noise available from apparatus 6. To control the time of operation of multivibrators 10 and 11 to accomplish the charging and discharging of the noise integrator 7 during proper intervals of a pulse period, delay multivibrator 12 is provided. This multivibrator is fed with the periodic synchronizing pulses S available over lead 13 from a source B. The synchronizing pulses from source B cause transmitter C to transmit radar pulses periodically to antenna D for radiation into space. The duplexer E operates in a well known manner to channel transmitted pulses to the antenna D, and received pulse echoes from the antenna to the receiver A.

Referring to Fig. 3 there is disclosed a detailed circuit diagram for accomplishing the functions indicated by the elements 1 through 12 of Fig. 2. Briefly, the radar echo and pulse signals shown in graph *a* of Fig. 1 are applied by lead 14 to the grid 15 of electron discharge device 16 operating as an amplifier. The amplified signals available at the anode 17 of device 16 then pass through the video amplifier and limiting video amplifier stages comprising electron discharge devices 18 and 19 respectively. The limited amplified signals available at the anode electrode 20 of device 19 are then applied through the coupling condenser 21 to the control electrode 22 of the electron discharge device 23 operating as a cathode follower. The cathode follower output which is developed across the cathode load resistor 24 is made available over lead 4 to subsequent stages which may include a cathode ray indicator for displaying the pulse echo returns. The operation of these circuits will be discussed in greater detail shortly.

To obtain the fast-acting automatic gain control action previously mentioned, the video output developed across the cathode load resistor 24 is also applied to the input circuit of electron discharge device 25. It should be noted that the electron discharge device 25 is of the triode type and has load resistor 24 connected between its cathode and ground. The anode electrode 26 of device 25 is energized from the battery 27 through the loading resistor 28 and its control electrode is grounded. The amplified video output available at anode 26 of device 25 is then applied over lead 5 and condenser 27' to the control electrode 28 of the gated noise amplifier 6. Amplifier 6 comprises an electron discharge device 29 having its anode connected through resistance 31 to the positive terminal of a source of operating potential 30. Electron discharge device 29 is normally held cut off by the negative bias applied to its control electrode 28 over resistors 32 and 33 from the unidirectional potential source 34 and to its suppressor electrode 36 over resistors 106, 107 and 108 from the unidirectional potential source 109. Thus under normal conditions device 29 is inoperative for passing the signals applied to its control electrode 28.

Assuming, however, that a positive gating pulse of sufficient amplitude is applied over lead 35 to the suppressor grid 36 of device 29, during a period when echo pulses are not observed, then device 29 is rendered conductive for the duration of the gating pulse to supply amplified noise signals over coupling condenser 37 to the cathode electrode 38 of diode 39. The negative polarity portions of the amplified noise signals available at cathode 38 are rectified by device 39 to charge condenser 40 substantially to the peak value of these noise signals. Since the duration of the gating pulses available over lead 35 is made a relatively small portion of the radar pulse period T, the charging circuit for condenser 40 is dimensioned to provide rapid charge of the condenser 40 to substantially the peak values of the applied signals available at the cathode electrode 38. Resistor 41 provides a path for the positive polarity portions of the gated noise signals to prevent any residual charge developing across condenser 37. Upon termination of the gating voltage available over lead 35, device 29 is once again rendered non-conductive because of the negative bias applied to its control grid from battery 34. Condenser 40, however, is unable to discharge back through diode 39 and therefore maintains its full negative charge. This negative charge on condenser 40 is applied over lead 42 to the control electrode 43 of electron discharge device 44 operating as a cathode follower. Device 44 has its anode electrode 45 connected to the positive terminal of a source of potential 30, and its cathode 46 connected through potentiometer 47 and resistor 48 to a source of negative potential 49. Normally, electron discharge device 44 conducts to develop a potential at the movable contactor 50 of potentiometer 47 which is negative with respect to ground. The voltage applied to control electrode 43 due to the charge on condenser 40 varies the value of the negative potential at the movable tap 50. This negative potential on tap 50 thus constitutes the gain control voltage employed for controlling the gain of the amplifier comprising device 16.

In order to provide a new gain control potential for each pulse period, means must be provided for discharging condenser 40 rapidly during each pulse period, and prior to operation of the gated noise amplifier 6 whose resultant output charges condenser 40 to a new level in accordance with the output available over lead 5. To accomplish this, a switch tube is provided comprising a pair of triodes 51 and 52 connected in parallel and having their common anodes 53 and 54 connected to one terminal of condenser 40 and their common cathodes 55 and 56 connected to the other terminal of condenser 40. Devices 51 and 52 are arranged to have their common grids 57 and 58 energized by a gating pulse delivered over lead 59. Devices 51 and 52 are normally held non-conductive because of the application of negative bias from the unidirectional potential source 49 over resistors 60, 61 and 62 and 63 to the control electrodes 57 and 58. Each positive going gating pulse over lead 59 overcomes the cut off bias and anode current flows in devices 51 and 52 thereby to discharge condenser 40 substantially to ground potential. Immediately after discharge of condenser 40, the noise gating pulse of predetermined duration is delivered to lead 35 causing device 29 to conduct and thereby charge condenser 40 through diode 39 to a new level dependent upon the amplitude of the video output available at lead 5.

In order to derive the gating pulses available over leads 35 and 59, and control their duration as well as their time of occurrence with respect to the time of occurrence of echo pulses, multivibrators 10, 11 and 12 are provided. These multivibrators are successively rendered operative under control of the synchronizing pulses available over lead 13 which control the time of each radar pulse transmission. Switch gate multivibrator 11 provides an output pulse which controls the discharge of condenser 40 and initiates operation of the sample gate multivibrator 10. Multivibrator 10 generates a subsequently occurring gating pulse permitting the charging of condenser 40 to a new level. The operation of switch gate multivibrator 11 in turn is controlled by operation of a delayed gate multivibrator 12 operating in synchronism with the positive going synchronizing pulses available over lead 13.

Multivibrator 12 comprises a pair of electron discharge devices 64 and 65 having their cathodes connected through a common load resistor 66 to ground and their anodes 67 and 68 energized through respective loading resistors 69 and 70 from the source of positive potential 71. Device 64 is normally conductive because of the connection of its control electrode 72 through resistors 73 and 74 to the source of positive potential 71. The conduction of device 64 causes a voltage drop across the load resistor 66 which is sufficient to maintain device 65 non-conductive. Upon the arrival of a positive going synchronizing pulse at the control electrode 75, device 65 is rendered conductive. The resultant negative going potential developed at the anode electrode 68 is coupled through the coupling condenser 76 to the control electrode 72, thereby rendering device 64 non-conductive.

The potential developed at anode 68 remains at a reduced value for an interval determined by the time constant of the circuit formed of condenser 76 and resistors 73 and 74. When condenser 76 attains a charge substantially equal to its original charge value, that is, prior to the conductive condition of device 65, device 64 is once again rendered conductive thereby cutting off device 65 because of its discharge current flow through the common cathode resistor 66. Thus, in response to the arrival of the synchronizing pulse over lead 13, a negative going square wave of voltage of predetermined time duration is developed at anode 68.

This negative going square wave of potential is differentiated by condenser 77 and resistor 78 and then applied to the control electrode 79 of multivibrator 11. Multivibrator 11 comprises devices 80 and 81 having their cathodes connected through a common load resistor 82 to ground and their anodes 83 and 84 energized through respective load resistors 85 and 86 from the potential source 71. Device 81 is normally held conductive because its grid electrode 87 is connected to the source of positive potential 71 through resistors 88 and 89. The resultant electron discharge current flow through the load resistor 82 causes the device 80 to be maintained cut off.

Differentiation of the square wave of voltage developed at anode 68 of device 65 yields a positive going pulse which is synchronous with the trailing edge of the square wave. This positive pulse is delayed with respect to the synchronizing pulse available on lead 13 depending upon the width of the negative going square wave of voltage developed at anode 68. This positive going pulse when applied to the electrode 79 of multivibrator 11 results in a positive going square wave of given time duration, small compared to the time interval between synchronizing pulses, being applied to lead 59 from anode 83. A negative going square wave similar to that applied to lead 59 is developed at anode 84. This negative going square wave is applied over lead 90 and differentiated by condenser 91 and resistor 92. The resultant differentiated voltage includes a positive going pulse synchronous with the trailing edge of the square wave of voltage developed at anode 84, and this differentiated voltage is applied to the control electrode 93 of multivibrator 10.

Multivibrator 10 comprises electron discharge devices 94 and 95 having their cathodes connected through a common load resistor 96 to ground, and their anode electrodes 97 and 98 connected through respective load resistors 99 and 100 to the source of positive potential 71. Device 95 is normally conductive because its control electrode 101 is connected through resistors 102 and 103 to the source of positive potential 71. The resultant electron discharge current flow through load resistor 96 causes device 94 to be held non-conductive. With device 94 normally held non-conductive, only the positive going portion of the differentiated wave applied to its control electrode 93 is effective in causing device 94 to conduct. Upon conduction of 94, a negative going voltage is developed at its anode electrode 98 and applied over condenser 104 to the control electrode 101 thereby causing device 95 to be cut off. The net result is that a positive going square pulse of voltage is developed at anode 97. This pulse is applied over condenser 105, resistor 106 and lead 35 to the suppressor electrode 36 of the gated noise amplifier 6.

The positive going pulse of voltage, generated at anode 97, occurs a given time interval after the arrival of a respective synchronizing pulse on lead 13. Specifically, the positive going gating pulse available on lead 35 commences at the termination of the positive going square wave applied over lead 59 which in turn occurs a given time after the arrival of a synchronizing pulse over lead 13. The duration of the positive going voltage developed at anode 97 depends upon the time constant of the circuit formed of condenser 104 and resistors 102 and 103. That is, device 95 is rendered non-conductive and it so remains during the time required for condenser 104 to attain substantially the charge potential it had before the application of the positive going differentiated pulse to grid 93 thereby to generate a positive pulse at anode 97.

Recapitulating the series of events effecting operation of the gated noise amplifier, the noise integrator and the discharge circuits, each incoming synchronizing pulse applied over lead 13 causes first the generation of a switch gate pulse at lead 59. This gate pulse occurs a predetermined time interval after the occurrence of a pulse on lead 13 and serves to discharge discharging condenser 40 through devices 51 and 52. Upon termination of the switch gate pulse a sample gate pulse is developed at lead 35 for operatively conditioning device 29 thereby to apply the noise output thereof to diode 39. Thus, condenser 40 is charged to the new noise amplitude level. The negative going charge developed across condenser 40 is translated by the cathode follower 8 which thereby provides a negative signal over lead 6 to control the amplification of amplifier 16.

As previously mentioned, the negative voltage generated at lead 6 is employed to control the gain of the amplifier comprising device 16 and thereby maintain the noise level at the output lead 4 substantially constant. Due to operation of the switch tubes 51 and 52 for effecting the rapid discharge of condenser 40 during each synchronizing pulse period, switching transients would normally be produced at the repetition rate of the synchronizing signals. To prevent the switching transients from effecting operation of the video amplifier, a balanced modulator arrangement comprising devices 16 and 109 is employed. The negative unidirectional potential proportional to noise level and including undesirable transients due to switching of the devices 51 and 52 is applied to the suppressor grid 107 of device 16 whose control grid 15 is energized with noise and pulse echoes from the second detector portion of the receiver, not shown, and available at lead 14. The control potential available over lead 6 is also applied to the suppressor grid 108 of device 109. Devices 16 and 109 have their anodes 17 and 110 connected through respective load resistors 111 and 112 to a source of operating potential 27, and their cathodes connected through respective load circuits to ground. A direct connection from the screen electrode 113 of device 109 to the anode electrode 17 of device 16 causes screen current of device 108 to flow through resistor 111. Devices 16 and 109 are so operated that the change of anode current in device 16 due to the control potential applied to its suppressor grid 107 is balanced by the change in screen current flow of device 109 in the opposite direction due to the same control potential applied to its grid 108. Thus no switching transients due to the control potential applied to suppressor grid 107 are developed at the anode 17. This arrangement permits the gain of device 16 to be varied by the control potential available over lead 6 such that the noise and signal applied to grid 15 are amplified to a degree determined by the unidirectional control potential from lead 6, although the transient effects are eliminated. Condenser 113′ operates as a filter for the frequencies developed in power supply 27. The control potential and the pulse echo signals available at anode 17 are applied over coupling condenser 114 to the control electrode 115 of device 18. Device 18 operates as an amplifier with its anode connected to source 27 through load resistor 117 and its cathode 118 connected through load circuit 119 to ground. The amplified output available at anode 116 is in turn applied through coupling condenser 120 to the control electrode 121 of a second electron discharge device 19 operating as an amplifier and limiter. Device 19 has its anode 20 connected through load resistor 122 to source 27 and its cathode 123 grounded. The voltage developed at anode 20 is then applied over condenser 21 to the control electrode 22 of device 23 operating as a cathode follower with its anode connected directly to the source of positive potential 27, and its cathode connected through the load resistor 24 to ground. The voltage developed across resistor 24 as a result of the noise and pulse signals applied to the grid electrode 22 may then be applied to succeeding circuits as, for example, an indicator for displaying the pulse echo returns. Device 25, having its anode connected through the load resistor 28 to the source of potential 27, its control electrode grounded and its cathode connected through the load resistor 24 to ground, amplifies the signal developed across resistor 24. The amplified signal at anode electrode 26 is applied over lead 5 to the gated noise amplifier device 29.

The use of multivibrators for timing the occurrence of the charging and discharging cycles of the storage circuit comprising condenser 40 permits rapid adjustment of the duration and the time occurrence of the gating pulses involved. For example, resistors 103, 89 and 74 associated with multivibrators 10, 11 and 12 are shown to be adjustable whereby the duration of the square pulses generated by the associated multivibrators may be varied. Also the rapid switching capabilities of the multivibrators permits a fast operating gain control operable over a wide range of noise levels.

In Fig. 4 the nature of the waveshapes encountered in the circuit arrangement of Fig. 3 is disclosed. The synchronizing pulses shown in graph *a* which trigger the radar transmitter operate delay multivibrator 12 to yield the square pulses of graph *b*. Differentiation of the square pulses of *b* by resistor 78 and condenser 77 yields the pulses of graph *c*. The positive going pulses of graph *c* operate the switch gate multivibrator 11 which yields the square waves of graph *f* employed to control the discharge time of condenser 40. Differentiation of the negative going voltage complement of the square pulses shown in *f* yields the pulses shown in graph *d*. The positive going pulses of graph *d* operate sample gate multivibrator 10 to yield the square pulses of graph *e*. These square pulses determine the sampling time of the noise signals available over lead 5 and, hence, determine the interval of charging of the condenser 40 to the sampled noise level. Thus if graph *g* illustrates the video signals available over lead 5 at grid 28, where R represents the radar echoes, the square pulses of graph *e* permit samples of the noise signals shown in graph *h* to control the charge across condenser 40 as shown in graph *i*. The resultant condenser charge then determines the gain of amplifier 16 in translating the video signals from the second detector of the receiver. The result is a gain control, adjustable from one radar pulse transmission to the next, resulting in improved reception and display of obstacle information.

A further application of the invention is its use as a guarding gate for echo pulses received outside the normal display range of the radar equipment. As previously mentioned, the detection and storage of noise pulses involves substantially peak detection. If during the noise sampling period, echo pulses are received from an obstacle, the action of the gain control circuit is to reduce the video gain of the receiver to a value such that the echo pulse amplitudes will be equal to the noise pulse amplitudes immediately preceding it. The resulting appearance on the PPI indicator is that of a dark angular sector in the displayed noise with the echo pulses representative of obstacles outlined against this darked background. The degree of darkening is a function of the signal to noise ratio of the sampled echoes. To illustrate the use of such an effect, consider a radar with a pulse repetition rate such that 130 miles of range is available. The probability of targets or obstacles occurring at ranges of over 100 miles might be considered remote, but on the chance that one might occur there, the operator must have the full range available on his indicator and suffer a compression of the more likely area. Utilizing the automatic gain control arrangement previously described, the operator is able to set the maximum indicated range to 100 miles and if targets did occur at ranges beyond this point, he would be aware of them because of a darker angle on the indicator subtending the sampled targets. He could then change the range indication to investigate them. The ratio of guarded to observed range could be altered to will.

While a specific embodiment has been shown and described it will be understood that various modifications may be made and developed without departing from the invention. The appended claims are therefore intended to cover any such modifications within the true spirit and scope of the invention.

What I claim as new and desire to secure by Letters Patent of the United States is:

1. In combination, a wave-translating channel including input, output and amplification-control circuits, means coupled to said input circuit for supplying to said channel a wave including recurrent intervals, each such interval comprising a first period wherein desired pulse signals occur and a second period extending substantially through the remainder of said interval, said channel being subject to extraneous noise which occurs in said output circuit concurrently with at least each of said second periods, means operated synchronously with said recurrent intervals and coupled to said output circuit for sampling the output of said translating channel during a portion of each of said second periods, an energy storage device coupled to said last-mentioned means responsive to said sampled outputs for deriving accumulations of energy each having a magnitude related to the amplitude of said extraneous noise which occurs during a respective one of said second periods, means operated synchronously with said recurrent intervals and coupled to said energy storage device for altering said accumulation of energy to establish a reference level in said device prior to each portion of said second periods, and means for adjusting the gain characteristic of said translating channel to successive discrete levels each corresponding to a single one of said successive derived accumulations for the reception of said desired pulse signals during the single first period subsequent thereto.

2. In combination means to recurrently transmit a pulse toward remote objects, means to receive corresponding pulses from said remote objects after each transmitted pulse at times corresponding to the distance to the respective objects, said receiving means being sensitive to undesired noise pulses, means for separately sampling the undesired noise pulses received in said receiving means during a portion of each recurrence period when pulses are not being received from said objects, means responsive to the magnitude of the pulses sampled in each of said period portions to provide a respective control voltage for each sampled portion having an amplitude corresponding to the magnitude of its related sampled pulses, and means responsive to the amplitude of each respective voltage to establish the gain control sensitivity of said receiving means only for the reception of pulses from said objects during the single recurrence period following the sample period from which the control voltage was provided.

3. An automatic gain control for a receiver of noise signals superimposed on recurrent desired signals comprising means for separately sampling the output of said receiver during a portion of each recurrence period when only noise pulses are being received, and means responsive to the intensity of the noise signals received during each sampled period portion to establish the gain of said receiver to a corresponding fixed level for the single recurrence period subsequent thereto.

4. An automatic gain control for a receiver of noise signals superimposed on desired pulse signals wherein said pulse signals are timed with respect to the occurrence of synchronizing signals comprising means timed with respect to each of said synchronizing signals for individually sampling the output of said receiver prior to the next succeeding synchronizing signal and during a period when only noise signals are being received, a storage circuit, means timed with respect to each of said synchronizing signals for separately charging said storage circuit subsequently to the peak amplitude of each of said sampled outputs, means timed with respect to said synchronizing signals for discharging said storage circuit to a predetermined level prior to each sampling period and during periods when only noise signals are being received, and means responsive to each of the separate charges stored in said storage circuit for establishing the gain of said receiver at a corresponding new fixed value for the reception of pulse signals during the single time period between synchronizing signals subsequent thereto.

5. An automatic gain control arrangement for a receiver of noise signals superimposed on recurrent signals wherein said recurrent signals are timed with respect to a source of synchronizing signals comprising means timed with respect to each of said synchronizing signals for recurrently sampling the output of said receiver for a period small compared to the time between recurrences of said recurrent signals and only during reception of said noise signals, and means responsive solely to the intensity of the outputs sampled during each of said periods for adjusting the gain of said receiver to a corresponding fixed level for the single subsequent period of recurrent signal reception.

6. An automatic gain control for a receiver of noise signals superimposed on desirable signals wherein said desirable signals are timed with the occurrence of synchronizing signals comprising means timed with respect to said synchronizing signals for deriving delayed trigger pulses, means synchronized with said trigger pulses for deriving first gating pulses, means timed with respect to said trigger pulses for deriving second gating pulses occurring after said first gating pulses, means synchronized with said second gating pulses for sampling the output of said receiver during periods when noise signals are being received, means for integrating said sampled outputs to derive a separate integrated output for each of said periods, means for adjusting the gain of said receiver to successive discrete levels each corresponding to a single one of said separate outputs for the reception of said desirable signals during the corresponding and immediately following synchronizing signal periods.

7. An automatic noise leveling circuit for a radar receiver of pulse signals reradiated from an obstacle located in the path of transmitted pulses comprising a first multivibrator responsive to said transmitted pulses for generating a delayed trigger pulse, a second multivibrator responsive to said delayed trigger pulse for generating a first gating pulse synchronous with said delayed trigger pulse and a second trigger pulse delayed with respect to said delayed trigger pulse, a third multivibrator responsive to said second delayed trigger pulse for generating a second gating pulse synchronous with said second delayed trigger pulse and occurring after said first gating pulse, said first and second gating pulses being timed to occur during a period when reradiated pulses are not being received, means coupled to said third multivibrator for sampling the output of said receiver during the occurrence of each successive one of said first gating pulses to derive separate successive control potentials, each of substantially fixed amplitude, dependent on the signal received during the corresponding gating pulse, means coupled to said sampling means and to said second multivibrator for altering said control potential to a reference value during the occurrence of each of said first gating pulses, and means coupled to said sampling means and to said receiver for adjusting the gain to successively correspond with the amplitude of each of said separate successive control potentials for reception of said reradiated pulses.

8. In combination, a wave-translating channel including input, output and control circuits, means coupled to said input circuit for supplying a wave to be translated by said channel, means coupled to said output circuit for sampling the output of said translating channel during a first terminal portion of repetitive operating intervals, an electrical energy storage device responsive to said output sampled during said first portion of said operating interval for storing a corresponding magnitude of energy related to the amplitude of the portions of said wave translated during said first portion, means for establishing the gain characteristic of said wave translating channel at a value corresponding to the stored energy for a second initial portion of the next operating interval, and means for altering the magnitude of said stored energy and the value of said gain characteristic to a reference level during a third intermediate portion of said next operating interval.

9. In combination, means for transmitting recurrent pulses of energy, means for receiving from remote objects corresponding pulses occurring during first intervals to represent objects within a given range and occurring during second intervals to represent objects within a range beyond said given range, said receiving means including an output circuit at which a wave comprising pulses representing said corresponding pulses appears, and including an amplification-control circuit, means coupled to said output circuit for deriving successive control signals, each having a magnitude related to the intensity of the portion of said wave which occurs during a respective one of said second intervals, means for altering the magnitude of said derived control signals to a reference level before each signal derivation, and means coupled to said amplification control circuit for adjusting the amplification of said receiving means to successive discrete levels each corresponding to a single one of said successively derived control signals.

References Cited in the file of this patent

UNITED STATES PATENTS

| | | |
|---|---|---|
| 2,402,445 | Poch | June 18, 1946 |
| 2,421,136 | Wheeler | May 27, 1947 |
| 2,446,244 | Richmond | Aug. 3, 1948 |
| 2,451,632 | Oliver | Oct. 19, 1948 |
| 2,459,117 | Oliver | Jan. 11, 1949 |
| 2,466,959 | Moore | Apr. 12, 1949 |
| 2,538,027 | Mozley et al. | Jan. 16, 1951 |
| 2,538,028 | Mozley | Jan. 16, 1951 |